US012760867B2

(12) United States Patent
Visser et al.

(10) Patent No.: US 12,760,867 B2
(45) Date of Patent: Oct. 13, 2026

(54) LIGHTING ASSEMBLY WITH ADJUSTABLE LED MODULE AND ASSEMBLY THEREFOR

(71) Applicant: NUMBER EIGHT LIGHTING COMPANY, Cotati, CA (US)

(72) Inventors: Joel Visser, Cotati, CA (US); Gary Cross, Cotati, CA (US)

(73) Assignee: NUMBER EIGHT LIGHTING COMPANY, Cotati, CA (US)

( * ) Notice: Subject to any disclaimer, the term of this patent is extended or adjusted under 35 U.S.C. 154(b) by 0 days.

(21) Appl. No.: 19/343,595

(22) Filed: Sep. 29, 2025

(65) Prior Publication Data

US 2026/0160406 A1 Jun. 11, 2026

Related U.S. Application Data

(60) Provisional application No. 63/729,159, filed on Dec. 6, 2024.

(51) Int. Cl.
*F21V 14/06* (2006.01)
*F21V 21/04* (2006.01)
*F21V 29/503* (2015.01)

(52) U.S. Cl.
CPC .............. *F21V 14/06* (2013.01); *F21V 21/04* (2013.01); *F21V 29/503* (2015.01)

(58) Field of Classification Search
CPC .......... F21V 21/30; F21V 21/04; F21V 14/06; F21V 29/503
See application file for complete search history.

(56) References Cited

U.S. PATENT DOCUMENTS

2014/0233246 A1* 8/2014 Lafreniere .............. F21S 8/026 362/382

* cited by examiner

*Primary Examiner* — Matthew J. Peerce
(74) *Attorney, Agent, or Firm* — Andrew F. Young, Esq.; NOLTE LACKENBACH SIEGEL

(57) ABSTRACT

A recessed lighting unit includes an adjustable LED lamp module and assembly. A fixture housing with the adjustable LED lamp module includes a heat sink assembly, wherein the heat sink assembly provides a continuously adjustable sliding thermal contact via an angularly adjustable contact guide member with a locking and guiding feature that maintain thermal transfer contact along an adjustment arc with a thermal base member. An LED emitter in the LED lamp module is in thermal contact with the contact guide member. The contact guide member includes a guiding and lockable rail feature in a lockable sliding contact with the thermal base member that is in a thermal contact with the recessed lighting unit. Relative thermal transfer surfaces are in mutual close association and may additionally include based thermal transfer layers for enhanced thermal transfer.

13 Claims, 6 Drawing Sheets

FIG. 9
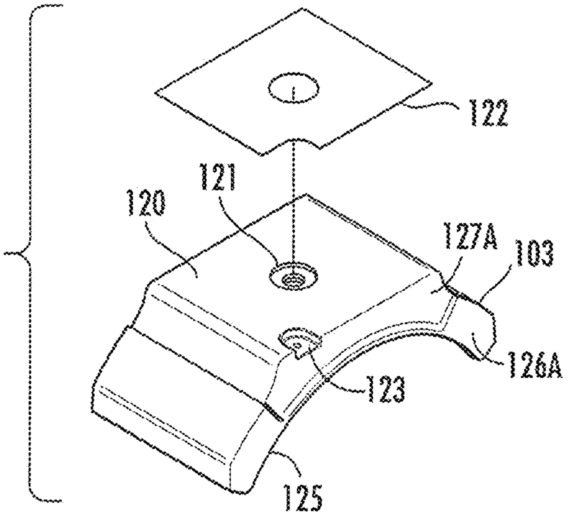
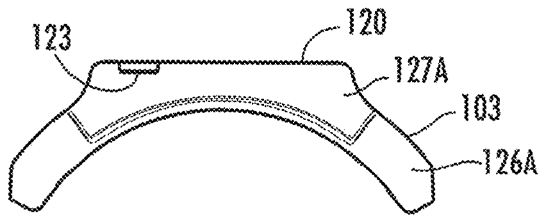
FIG. 10

LIGHTING ASSEMBLY WITH ADJUSTABLE LED MODULE AND ASSEMBLY THEREFOR

CROSS-REFERENCE TO RELATED APPLICATIONS

This application relates to, and claims priority from, U.S. Prov. Ser. No. 63/729,159 filed Dec. 6, 2024, the entire contents of which are incorporated herein fully by reference as if adopted in their entirety.

FIGURE SELECTED FOR PUBLICATION

FIG. 15.

STATEMENT REGARDING FEDERALLY SPONSORED RESEARCH OR DEVELOPMENT

Not applicable

BACKGROUND OF THE INVENTION

Field of the Invention

A recessed lighting unit includes an adjustable LED lamp module and assembly with arc adjustment and a heat sink arrangement that provides a continuously adjustable sliding thermal contact via an angularly adjustable contact guide member. More particularly, the present invention provides an adjustable contact guide member with a locking and guiding feature that maintains thermal transfer contact along an adjustment arc with a thermal base member.

Description of the Related Art

This section of this document introduces various information from the art that may be related to or provide context for some aspects of the technique described herein and/or claimed below. It provides background information to facilitate a better understanding of that which is disclosed herein. This is a discussion of “related” art. That such art is related in no way implies that it is also “prior” art. The related art may or may not be prior art. The discussion in this section is to be read in this light, and not as admissions of prior art.

Conventional LED (Light Emitting Diode) assemblies are solid state assemblies that rely on fixed-in-place constructions and commonly the use of extended thin metal fins for radiative heat conduction to radiate thermal heat build up in to the ambient air.

Conventional LED assemblies are therefore often large and bulky in nature so as to provide a large amount of air-access for heat dissipation, or where provided in smaller form require rigid extended radiative fins that are maladaptive to convenient structural arrangements.

One particular challenge in the conventional LED lighting arts is that thermal build up provides enhanced degradation cycles and accompanying unit loss and reliability failures, and accordingly detrimental use in architectural structures that require replacement, repair, and associated costs.

The present invention is directed to resolving, or at least reducing, one or all of the problems mentioned above.

ASPECTS AND SUMMARY OF THE INVENTION

According to one adaptive aspect of the present invention there is provided a recessed lighting unit including an adjustable LED lamp module and assembly. A fixture housing with the adjustable LED lamp module includes a heat sink assembly, wherein the heat sink assembly provides a continuously adjustable sliding thermal contact via an angularly adjustable contact guide member with a locking and guiding feature that maintain thermal transfer contact along an adjustment arc with a thermal base member. An LED emitter in the LED lamp module is in thermal contact with the contact guide member. The contact guide member includes a guiding and lockable rail feature in a lockable sliding contact with the thermal base member that is in a thermal contact with the recessed lighting unit. Relative thermal transfer surfaces are in mutual close association and may additionally include based thermal transfer layers for enhanced thermal transfer.

According to a further adaptive aspect of the present invention, there is provided a recessed lighting unit, comprising: an adjustable lamp holder assembly, a fixture housing within which the adjustable lamp holder assembly is mounted, a thermal base member mounted on the adjustable lamp holder assembly, and an angularly adjustable contact guide member adjustably mountable to the thermal base member.

According to a further adaptive aspect of the present invention, there is provided a recessed lighting unit, further comprising: a mount surface on a base side of the thermal base member oppose a curved surface, a mount hole assembly on the thermal base member allowing a rotational and a fixing connection between the mount surface of the thermal base member and the fixture housing, a pair of opposed guide rails bounding sides of the curved surface extending away from the mount surface, and wherein each the opposed guide rail has a contact curve surface that corresponds to a curved surface arc of the curved surface.

According to a further adaptive aspect of the present invention, there is provided a recessed lighting unit, further comprising: a curved mating surface on the angularly adjustable contact guide member opposite a flat mating surface, the curved mating surface shaped to correspond with the curved surface of the thermal base member during an assembly, a lamp assembly mounted on the flat mating surface opposite the curved mating surface, a pair of opposed guiding channels extending proximate opposite sides of the flat mating surface of the angularly adjustable contact guide member, and respective the opposed guiding channels engaging respective opposed guiderails during the assembly wherein an arcuate guiding contact is provided between the curved mating surface and the curved surface of the thermal base member.

According to a further adaptive aspect of the present invention, there is provided a recessed lighting unit, further comprising: a thermal pad positioned between the mount surface of the base side of the thermal base member and the fixture housing, whereby the thermal pad enhances a thermal transfer between the thermal base and the fixture housing.

According to a further adaptive aspect of the present invention, there is provided a recessed lighting unit, further comprising: a thermal pad on the curved mating surface of the angularly adjustable contact guide member, whereby the thermal pad enhances a thermal transfer between the angularly adjustable contact guide member and the thermal base member.

According to a further adaptive aspect of the present invention, there is provided a recessed lighting unit, further comprising: a thermal mount between the lamp assembly and the flat mating surface on the thermal base member, whereby the thermal mount enhances a thermal transfer between the lamp assembly and the angularly adjustable contact guide member.

According to a further adaptive aspect of the present invention, there is provided a recessed lighting unit, further comprising: at least one locking element on one of the opposed guiding channels providing a locking function between the angularly adjustable contact guide member and the thermal base member at a location along the curved surface, and whereby the lamp assembly mounted on the flat mating surface of the angularly adjustable contact guide member is slidably and lockably adjustable relative to the thermal base member and the respective fixture housing during a use.

According to a further adaptive aspect of the present invention, there is provided a recessed lighting unit, as shown and described herein.

According to a further adaptive aspect of the present invention, there is provided a method of assembling and adjusting a recessed lighting unit, as shown and described herein.

The above and other aspects, features and advantages of the present invention will become apparent from the following description read in conjunction with the accompanying drawings, in which like reference numerals designate the same elements. The summary is not an exhaustive overview, nor is it intended to identify key or critical elements to delineate the scope of the subject matter claimed below. Its sole purpose is to present some concepts in a simplified form as a prelude to the more detailed description set forth below.

BRIEF DESCRIPTION OF THE DRAWINGS

The invention may be understood by reference to the following description taken in conjunction with the accompanying drawings, in which like reference numerals identify like elements.

FIG. 9 is an exploded perspective view of a thermal base member.

FIG. 10 is a side elevation view of the thermal base member.

Figure 1:
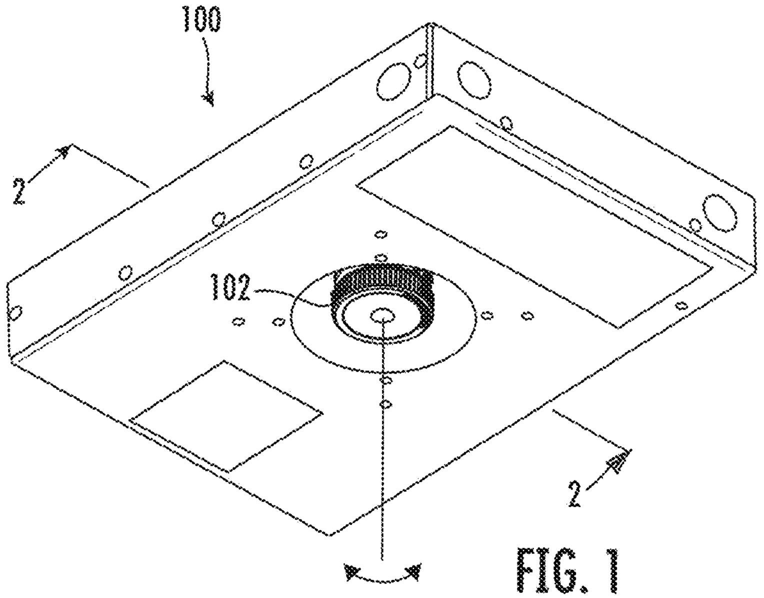
FIG. 1 is a perspective view of a recessed lighting unit assembly.
Figure 2:
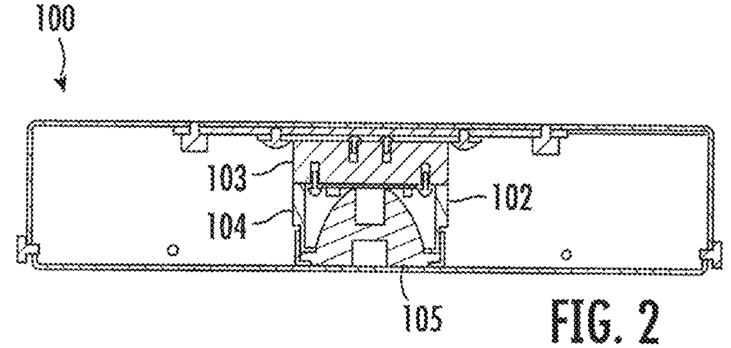
FIG. 2 is a partial sectional view along section 2-2 in FIG. 1.
Figure 3:
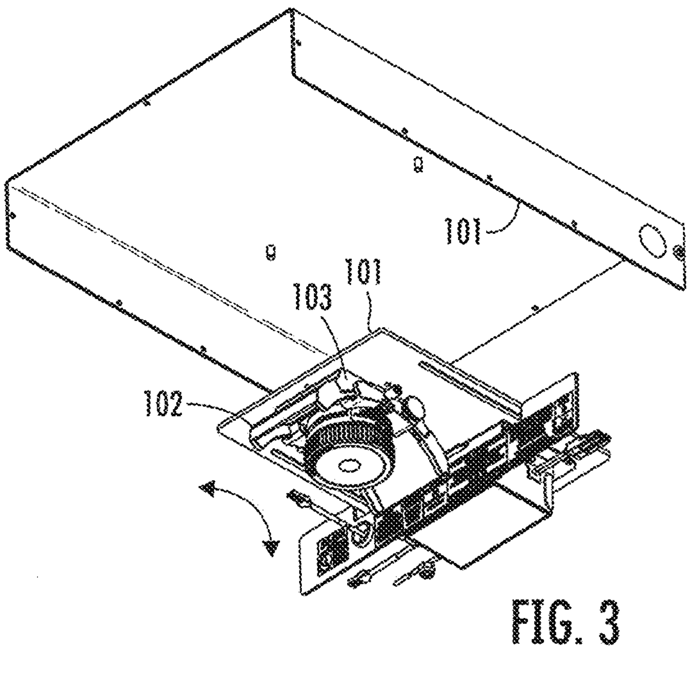
FIG. 3 is a partial exploded view of the recessed lighting unit in FIG. 1.
Figure 4:
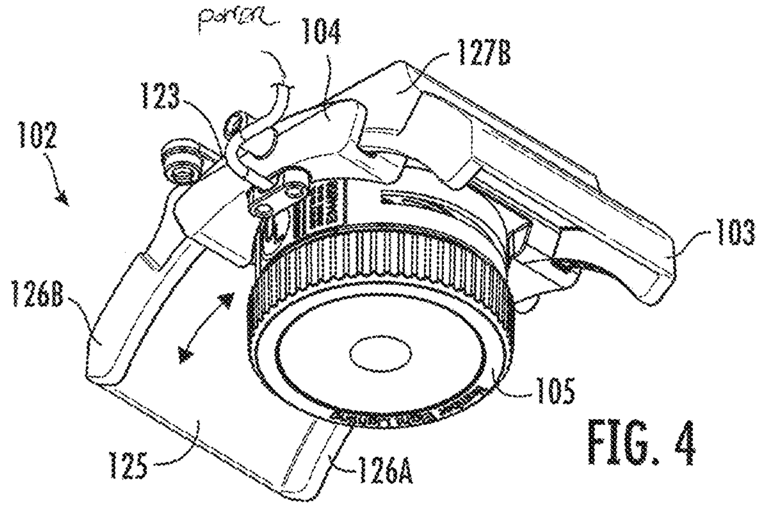
FIGS. 4, 5, and 6 are perspective views of the adjustable lamp module in the lighting unit.
Figure 5:
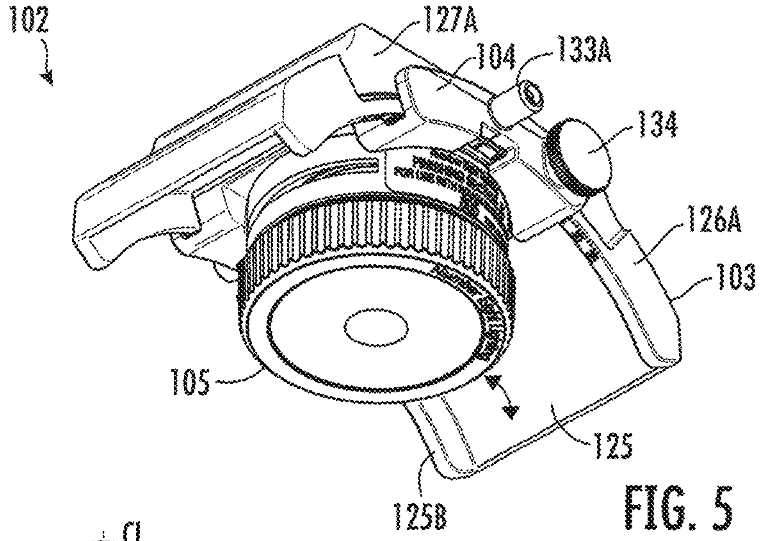
Figure 6:
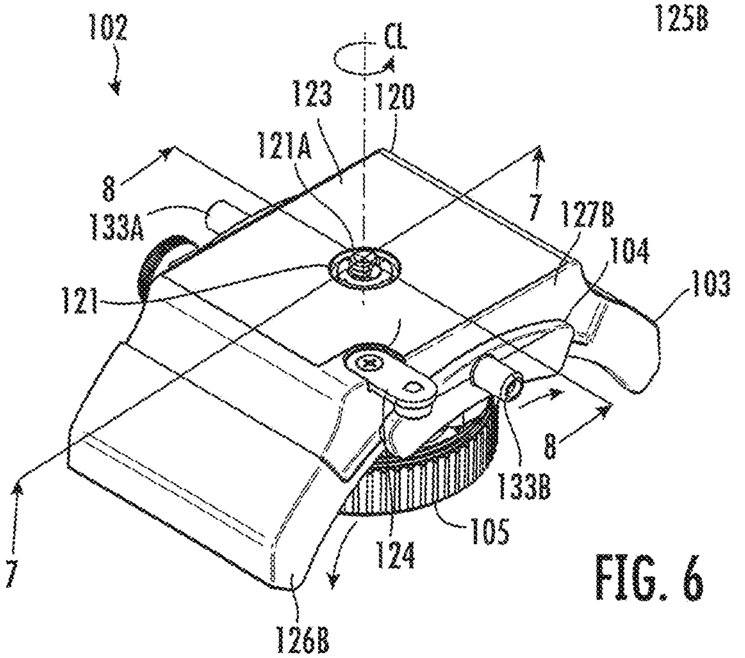

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Illustrative embodiments of the subject matter claimed below will now be disclosed. In the interest of clarity, not all features of an actual implementation are described in this specification. It will be appreciated that in the development of any such actual embodiment, numerous implementation-specific decisions must be made to achieve the developers'specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to FIGS. 1 to 15, a recessed lighting unit 100 has a fixture housing 101 within which an adjustable LED (Light Emitting Diode) lamp holder assembly 102 is mounted allowing holding a lamp assembly 105 for relative angular adjustment, as will be described.

Recessed lighting unit 100 and lamp element 105 and the associated components, elements, and functions for a lamp including electrical contacts, supplies, program drivers, connectors, printed circuit boards (PCBs) and related lenses, elements and features will be understood by those of skill in the art to be included herein in functional form effective to operate as recessed lighting unit 100. As shown, recessed lighting unit 100 with fixture housing 101 is substantially enclosed and has a lowered or thin profile. The frame (shown not numbered) is constructed from a metal or metal alloy (including aluminum or metal or alloy plate for the enclosure and supporting elements).

Adjustable lamp holder assembly 102 includes a rotatable thermal base assembly 103 (as a lower heat sink) thermally, pivotably, and fixably mounted to the fixture housing 101 and an angularly adjustable contact guide assembly 104 (as an upper heat sink) thermally, pivotably and lockably mounted to the thermal base assembly 103 following a desired adjustment. Lamp assembly 105 is thermally mounted to adjustable contact guide assembly 104 as will be discussed.

Lamp assembly 105 includes an LED (light emitting diode) emitter assembly with a printed circuit board (PCB) 106 that is directly mounted on in a fixed form (such as with a screw or threaded attachment), or with the inclusion of thermal mounting and bonding paste (known in the art, such as ARCTIC® MX-4 provided by Artic Inc., Shanghai, China) or with a thermal pad (such as graphite provided by HPMS® Graphite, Inc. of Woodland Hills, CA), the mating surface 107 of adjustable contact assembly 104, as shown. In this particular arrangement (optional) is a further mounted printed circuit board (PCB) 108 with a power connection feature to provide electrical power to the LED. A protective light shroud 109 having a threated outer perimeter encloses lens elements as will be noted. A protective light cap 110 has a threaded interior that engages with protective light shroud 109 to enclose lens elements as shown. A lens 111 projects from LED PCB boards 106, 108 as shown protecting and transmitting light emitted from the LED. A diffuser 113 and a filter 114 are optionally and preferably provided on lamp assembly 105 as shown to improve light emission quality. As a result, it will be appreciated that any thermal energy (heat) generated by operating the LED emitter will be received on mating surface 107.

Adjustable contact guide assembly 104 and thermal base assembly 103 are constructed from thermal transmissive materials, preferably metal and more preferably aluminum, without limitation.

Thermal base assembly 103 includes a smooth flat mount surface 120 facing the housing module 101 and defines a mount hole 121 for secure fixing thereto. During assembly, a threaded fastener 121A is passed through mount hole 121 and is secured to mount thermal base assembly 103 to an inner surface of the fixture housing module 101 as shown. Preferably, there is an additional thermal pad 122 positioned between thermal base assembly 103 and fixture housing module 101, as shown, to improve thermal conductivity and thermal transfer; and such a thermal pad 122 may be a carbon-based materials, for example that provided by HPMS® Graphite, Inc., of Woodland Hills, CA, model HGS-012 but is not limited thereto. Due to the mounting structure, it will be recognized that thermal base assembly 103 may be rotationally pivoted relative to the fixture housing module 101 in a full circle with a pivot center being the hole 121. As a result, the related swing/tilt of the light itself will be recognized as being within a full half-hemisphere relative to the mount plane allowing for both a full circle rotation and a full pivot along the adjustable contact guide assembly 104. As a result, the rear surface 120 of thermal base assembly 103 includes a recess 123 shaped to receive a lock-down piece and threaded fastener assembly 124 (See FIG. 6). In this manner, those of skill in this art will appreciate that upon assembly, at a preferred rotation and tightening of fastener 121A in hole 121 (see reference to center-line CL shown in FIG. 6 noting the rotation possible before tightening), that the lock-down piece and threaded fastener assembly 124 may be fixed to the fixture housing module 101 and thereby prevent further unintended rotation while also providing an enhanced thermal conduction through to fixture housing module 101.

Thermal base assembly 103 includes a uniformly curved surface 125 opposite mount surface 120, as shown, with two extending curved wings on either side thereof extending away from the center region; and respective guide rails 126A, 126B projecting thereabove and following a guide curve matching the curve of curved surface 125 forming a receiving guiding channel along curved surface 125 between respective guide rails 126A, 126B. Each guide rail 126A, 126B includes an outer side locking surface 127A, 127B, for locking engagement, as will be discussed.

It will be understood that optionally uniformly curved surface 125 and/or mating surface 107 (or both) may be covered with a thermal transfer sliding material such as that noted above based on carbon-materials (e.g., supplied by HPMS® Graphite, Inc. or another), so as to further enhance thermal transfer during a use.

The angularly adjustable contact guide assembly 104 (as the upper heat sink) includes mating surface 107, as noted on a top thereof for thermally mounting and fixing lamp assembly 105 in the adjustable LED lamp module 102 (lamp holder assembly). The mating surface 107 is a flat plane surface on a top side of a sliding base element 130 that includes two opposed guiding channels 130A, 130B on either side of mating surface 107 with respective channel openings that receive and slidingly engage along the same arcuate curve with respective guide rails 126A, 126B so as to allow mating surface 107 to slide along the uniformly curved surface 125 in thermal base assembly 103 while maintaining a continuous surface contact. To aid in this continuous surface contact a thermal pad 132 may be mounted to the curved sliding mating surface 107. Thermal pads 132, 122 may be formed from the same material, or may be different materials depending upon the required construction for the recessed lighting unit 100 so as to mitigate thermal detriment.

Respective opposed guiding channels 130A, 130B, riding on respective guide rails 126A, 126B each include respective locking elements 133A, 133B, each formed as threaded assemblies with a threaded locking pins (shown) retained within threaded chambers (shown) so as to allow each respective threaded locking pin to be threaded inwardly to tighten against the respective guide rails 126A, 126B and lock adjustable contact guide assembly 104 to thermal base assembly 103 in a desired location along the arcuate mating surface 107 so as to adjust the relative angle of the light emission relative to the recessed lighting unit 100. Prior to locking, or during an adjustment phase, a knurled knob member 134 is provided through one or more of the opposed guiding channels 130A, 130B to allow a hand-tightening before full application of respective locking elements 133A, 133B.

Figure 7:
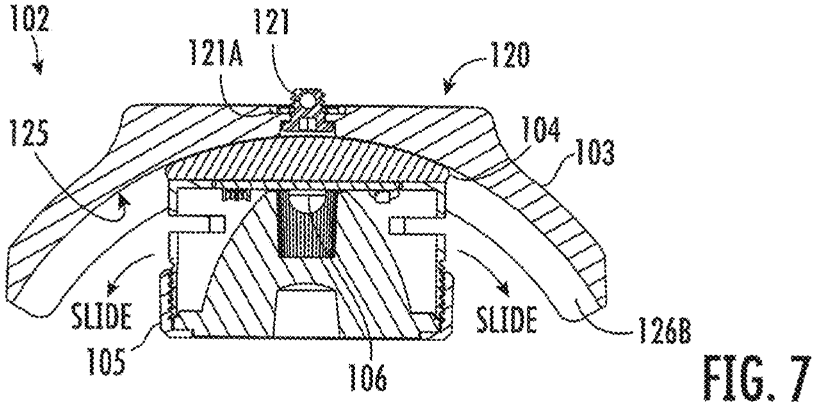
FIG. 7 is a sectional view along section 7-7 in FIG. 6.
Figure 8:
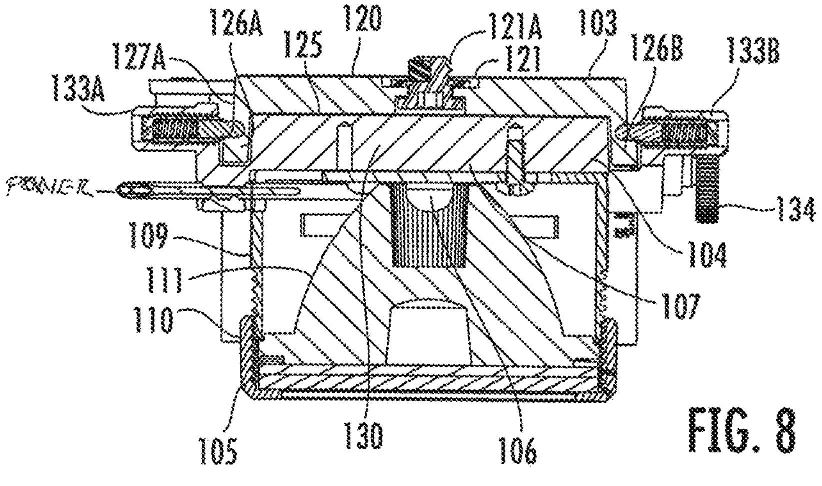
FIG. 8 is a sectional view along section 8-8 in FIG. 6.
Figure 11:
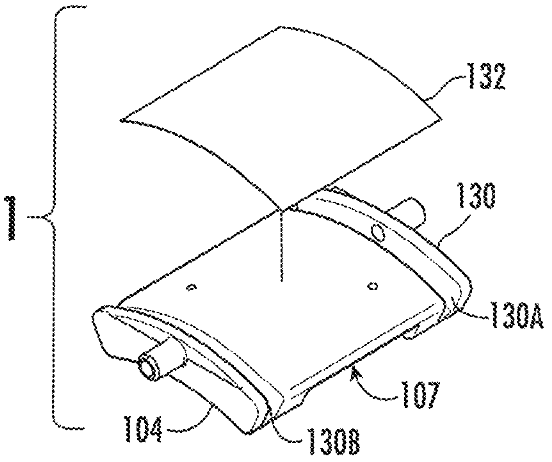
FIG. 11 is an exploded perspective view of an angularly adjustable contact guide member.
Figure 12:
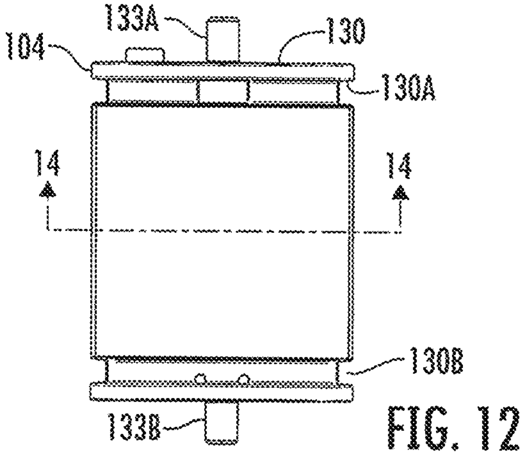
FIG. 12 is a top view of the adjustable contact guide member in FIG. 11.
Figure 13:
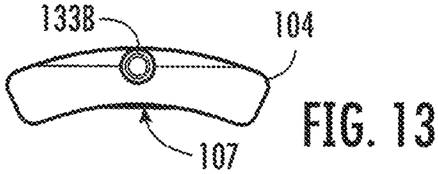
FIG. 13 is a side view of FIG. 12.
Figure 14:
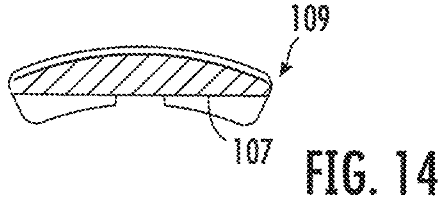
FIG. 14 is a sectional view along section 14-14 in FIG. 12.
Figure 15:
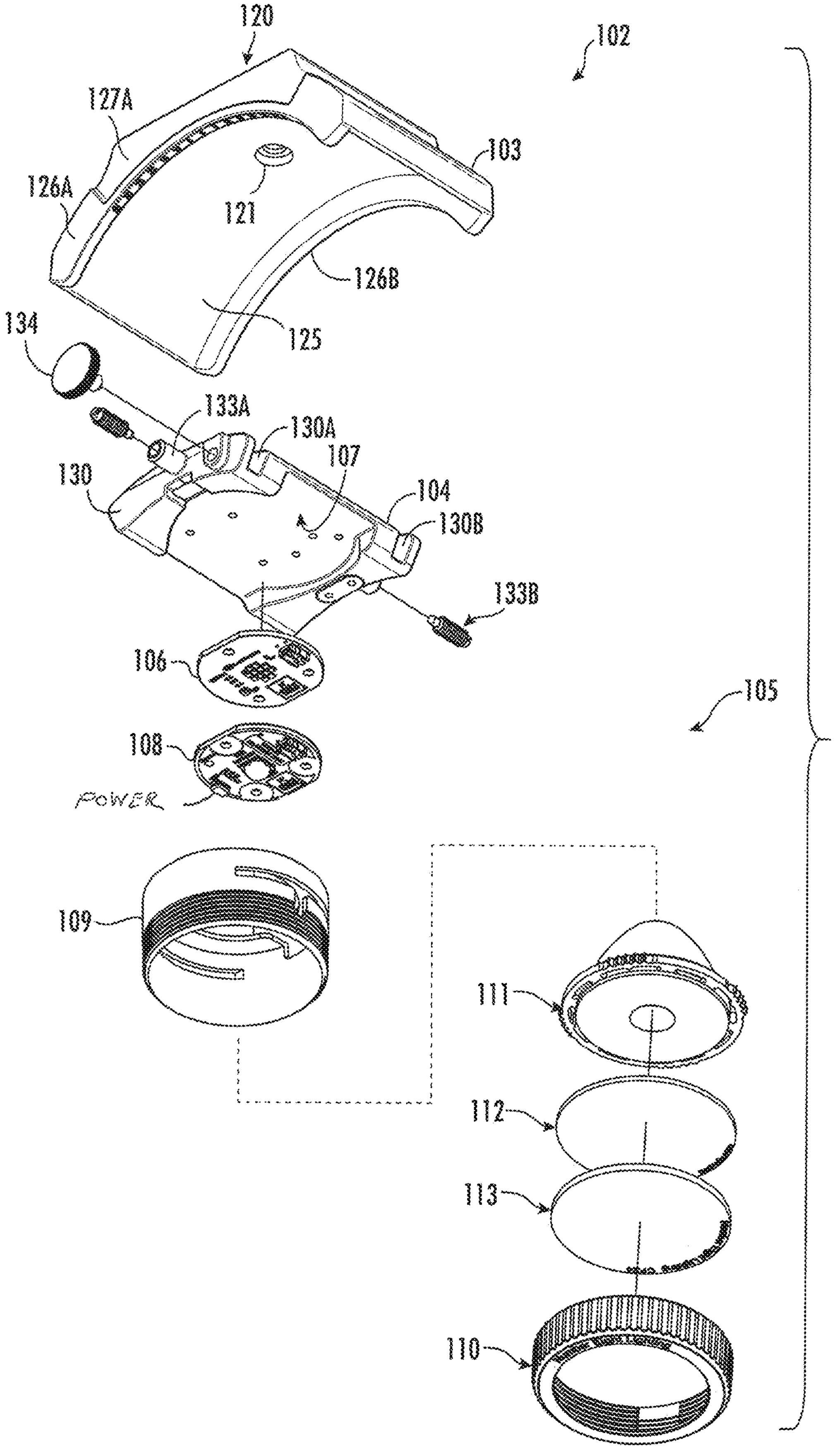
FIG. 15 is a partial perspective exploded view of the adjustable lamp module and lamp holder assembly.

Referring now to FIG. 7, it is noted that angularly adjustable contact guide assembly 104 is slidable along the respective thermal base assembly 103 while maintaining continuous contact between curved surface 125 (on thermal base 103) and arcuate mating surface 107 (on contact guide assembly 104). The range of this sliding adjustment is within the range of zero degrees (e.g., remaining dead-center) to approximately +/−sixty (60) degrees and more preferably to within +/−forty (40) degrees of the center position (noted in the images and recognized as also the center line (CL) noted in FIG. 6). As a result, it will be appreciated by those of skill in this art that thermal base assembly 104 is positionable and lockable, and repositionable, along the arcuate surface.

As a further benefit of the proposed invention herein, the use of one or more thermal pads (122, 132) between the sliding surfaces may enhance thermal transfer while retaining continuous contact areas; and it is that the present invention includes the use of no thermal pad, one thermal pad, or multiple thermal pads, in any combination thereof. It is further to be understood by the present invention that the thermal pads noted need not be made of graphite but may be provided in any suitable thermal transfer material now known or later developed while remaining within the scope and spirit of the present invention.

It will be further understood that the provided power linkage (shown but not numbered) (see FIGS. 4, 8, 15) that the present invention allows for flexible and reliable power connection for a long life span due to the uniformity of operation and security of positioning during assembly at a use location.

It will be further understood that the proposed invention provides a substantially improved thermal transfer of any thermal energy from the lamp holder assembly, angularly adjustable contact guide assembly, and the thermal base and entire lamp assembly combined outwardly to the fixture housing of the recessed lighting unit. As a consequence thereof, the present invention provides a substantially compact profile with improved thermal dissipation and thereby improved lifespan and energy efficiency in addition to the ability to provide light throughout a large cone of adjustment range. The use of the entire low profile lighting unit to dissipate thermal buildup is a potential benefit additionally to the building arts where the present invention allows use in either newly constructed low-narrow-thin ceiling-height arrangements (e.g., multi-story apartment buildings that can gain an additional floor over a twenty(20)-floor height by saving several inches per-floor by using a thin ceiling with the present low-profile lighting units); and in retrofitting prior existing structures with a low-profile lighting unit since the over head space (inner-joist-space) is otherwise occupied by HVAC, water, or other construction elements.

It will be further understood that the present invention allows the provision in a kit-form with a main fixture housing in the recessing lighting unit (shown) along with swapable lamp assemblies that may be provided in the adjustable improved form discussed herein and/or in addition to a fixed-position lamp assembly with a lamp provided in a fixed form arrangement (e.g., fixed directly downwardly or fixed at a particular set angle).

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A recessed lighting unit, comprising:
- an adjustable lamp holder assembly;
- a fixture housing within which said adjustable lamp holder assembly is mounted;
- a thermal base member mounted on the adjustable lamp holder assembly, said thermal base member comprising:
  - a curved surface; and
  - a pair of opposed guide rails projecting from and bounding opposite sides of said curved surface;
- an angularly adjustable contact guide member adjustably mountable to said thermal base member-, said angularly adjustable contact guide member comprising:
  - a curved mating surface shaped to correspond with said curved surface of said thermal base member;
  - a flat mating surface opposite said curved mating surface, a lamp assembly mounted on said flat mating surface; and
  - a pair of opposed guiding channels extending proximate opposite sides of said flat mating surface, respective said opposed guiding channels engaging respective said opposed guide rails,
- wherein respective engagement between said opposed guide rails and said opposed guiding channels provides an arcuately guided sliding movement of said angularly adjustable contact guide member relative to said thermal base member while maintaining continuous surface thermal contact between said curved mating surface and said curved surface throughout angular adjustment of said lamp assembly, without disengagement of said opposed guide rails from said opposed guiding channels.

2. The recessed lighting unit, according to claim 1, wherein the thermal base member further comprises
- a mount surface on a base side opposite said curved surface and a mount hole assembly allowing a rotational and fixing connection between said thermal base member and said fixture housing.

3. The recessed lighting unit, according to claim 1, wherein each said opposed guide rail has a contact curve surface corresponding to a curved surface arc of said curved surface to provide an arcuate guiding contact with said curved mating surface throughout angular adjustment.

4. The recessed lighting unit, according to claim 2, further comprising a thermal pad positioned between said mount surface of said thermal base member and said fixture housing.

5. The recessed lighting unit, according to claim 1, further comprising a thermal pad positioned between said curved mating surface of said angularly adjustable contact guide member and said curved surface of said thermal base member.

6. The recessed lighting unit, according to claim 1, further comprising a thermal mount positioned between said lamp assembly and said flat mating surface of said angularly adjustable contact guide member.

7. The recessed lighting unit, according to claim 1, further comprising at least one locking element provided on one of said opposed guiding channels, said locking element being configured to directly engage a respective one of said opposed guide rails to selectively lock said angularly adjustable contact guide member and relative to said thermal base member while maintaining engagement between said opposed guiding channels and said opposed guide rails.

8. A recessed lighting kit, comprising:
- an adjustable lamp holder assembly;
- a fixture housing within which said adjustable lamp holder assembly is mounted;
- a thermal base member mounted on said adjustable lamp holder assembly, said thermal base member comprising:
  - a curved surface; and
  - a pair of opposed guide rails projecting from and bounding opposite sides of said curved surface;
- an angularly adjustable contact guide member adjustably mountable to said thermal base member, said angularly adjustable contact guide member comprising:
  - a curved mating surface shaped to correspond with said curved surface of said thermal base member;
  - a flat mating surface opposite said curved mating surface, a lamp assembly being mounted on said flat mating surface; and
  - a pair of opposed guiding channels extending proximate opposite sides of said flat mating surface, respective said opposed guiding channels engaging respective said opposed guide rails,
- wherein respective engagement between said opposed guide rails and said opposed guiding channels provides an arcuately guided sliding movement of said angularly adjustable contact guide member relative to said thermal base member while maintaining continuous surface thermal contact between said curved mating surface and said curved surface throughout angular adjustment of said lamp assembly, without disengagement of said opposed guide rails from said opposed guiding channels.

9. The recessed lighting kit, according to claim 8, wherein the thermal base member further comprises a mount surface on a base side opposite said curved surface and a mount hole assembly allowing a rotational and fixing connection between said thermal base member and said fixture housing.

10. The recessed lighting kit, according to claim 8, wherein each said opposed guide rail has a contact curve surface corresponding to a curved surface arc of said curved surface to provide an arcuate guiding contact with said curved mating surface throughout angular adjustment.

11. The recessed lighting kit, according to claim 9, further comprising a thermal pad positioned between said mount surface of said thermal base member and said fixture housing.

12. The recessed lighting kit, according to claim 8, further comprising at least one locking element provided on one of said opposed guiding channels, said locking element being configured to directly engage a respective one of said opposed guide rails to selectively lock said angularly adjustable contact guide member relative to said thermal base member while maintaining engagement between said opposed guiding channels and said opposed guide rails.

13. A method of assembling and adjusting a recessed lighting unit, comprising the steps of:

assembling a recessed lighting unit, comprising:

an adjustable lamp holder assembly;

a fixture housing within which said adjustable lamp holder assembly is mounted;

a thermal base member mounted on said adjustable lamp holder assembly, said thermal base member comprising:

a curved surface;

a mount surface on a base side opposite said curved surface:

a mount hole assembly allowing a rotational and fixing connection between said thermal base member and said fixture housing; and a pair of opposed guide rails bounding sides of said curved surface;

mounting an angularly adjustable contact guide member on said thermal base member;

adjusting said angularly adjustable contact guide member relative to said thermal base member to a desired angular position;

securing said fixing connection between said thermal base member and said fixture housing to retain said adjustable lamp holder assembly in the desired angular position;

providing said angularly adjustable contact guide member with a curved mating surface shaped to correspond with said curved surface of said thermal base member;

a flat mating surface opposite said curved mating surface, a lamp assembly being mounted on said flat mating surface; and a pair of opposed guiding channels extending proximate opposite sides of said flat mating surface;

engaging respective opposed guiding channels with respective opposed guide rails;

arcuately sliding said angularly adjustable contact guide member relative to said thermal base member by engagement between said opposed guiding channels and said opposed guide rails while maintaining continuous surface thermal contact between said curved mating surface and said curved surface throughout angular adjustment of said lamp assembly, without disengagement of said opposed guide rails from said opposed guiding channels.

* * * * *